US007962789B2

(12) United States Patent
Sampige et al.

(10) Patent No.: US 7,962,789 B2
(45) Date of Patent: Jun. 14, 2011

(54) METHOD AND APPARATUS FOR AUTOMATED TESTING OF A UTILITY COMPUTING SYSTEM

(75) Inventors: Sahana Prabhakar Sampige, Kamataka (IN); Neelima Ghani, Kamataka (IN); Krishna Prabhakar Prabhu, Kamataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1130 days.

(21) Appl. No.: 11/476,259

(22) Filed: Jun. 28, 2006

(65) Prior Publication Data

US 2007/0005767 A1 Jan. 4, 2007

(30) Foreign Application Priority Data

Jul. 4, 2005 (IN) ............................ 860/CHE/2005

(51) Int. Cl.
*G06F 11/00* (2006.01)

(52) U.S. Cl. ........................................................ 714/26

(58) Field of Classification Search ..................... 714/26
See application file for complete search history.

(56) References Cited

U.S. PATENT DOCUMENTS

| | | | | |
|---|---|---|---|---|
| 6,094,731 | A * | 7/2000 | Waldin et al. | 714/38 |
| 6,123,737 | A * | 9/2000 | Sadowsky | 717/173 |
| 2002/0116507 | A1* | 8/2002 | Manjure et al. | 709/229 |
| 2002/0116639 | A1* | 8/2002 | Chefalas et al. | 713/201 |
| 2004/0015975 | A1* | 1/2004 | Nandigama et al. | 718/104 |
| 2004/0103309 | A1* | 5/2004 | Tracy et al. | 713/201 |
| 2005/0021869 | A1* | 1/2005 | Aultman et al. | 709/249 |
| 2005/0022018 | A1* | 1/2005 | Szor | 713/201 |
| 2005/0096864 | A1 | 5/2005 | Bonilla | |

OTHER PUBLICATIONS

Chicago Test Systems Inc., "Chicago Test Systems", 2001; http://www.test-engine.com/Service/cts.

* cited by examiner

*Primary Examiner* — Scott T Baderman
*Assistant Examiner* — Yair Leibovich

(57) ABSTRACT

An apparatus is disclosed for testing a utility computing system having a plurality of hardware and/or software planes. The apparatus comprises a plurality of administration units, each administration unit being arranged to carry out test operations on a utility computing system during use, and each administration unit having associated access details usable to gain access to at least one plane of the utility computing system during use, an authenticator arranged to receive access details and to permit or restrict access by an administration unit to one or more planes of the utility computing system during use depending on whether the received access details correspond to the access details associated with the administration unit, and a dispatcher arranged, for each administration unit, to automatically forward the access details associated with the administration unit to the authenticator so as to thereby permit the administration unit to gain access to one or more planes of the utility computing system during use and carry out test operations on said accessed one or more planes.

24 Claims, 3 Drawing Sheets

METHOD AND APPARATUS FOR AUTOMATED TESTING OF A UTILITY COMPUTING SYSTEM

BACKGROUND OF THE INVENTION

In the present specification, a "utility computing system" will be understood to mean one or more hardware or software components connected to each other or network able to each other.

It is known to provide such a utility computing system in the form of an enterprise data center having a pool of resources available to end users. In order to ensure that the resources in the data center are operating correctly, administration personnel are used to validate typical use cases, monitor the resources, perform backup operations, carry out maintenance, and so on.

However, the operations which may be carried out on the data center span various roles, various planes of the data center, and require various levels of authentication, with each role often being carried out by a different person. For example, in an organization having an enterprise data center of significant size, it is not unusual to employ a backup administrator, a network administrator, a data center administrator, a farm administrator, a system administrator, and so on. As a consequence, for an enterprise data center of significant size, the task of coordinating operations between the various data center personnel in order to carry out appropriate end-to end verification of data center functionality can be difficult.

BRIEF DESCRIPTION OF THE DRAWINGS

The present invention will now be described, by way of example only, with reference to the accompanying drawings, in which.

DETAILED DESCRIPTION OF EMBODIMENT OF THE INVENTION

Figure 1:
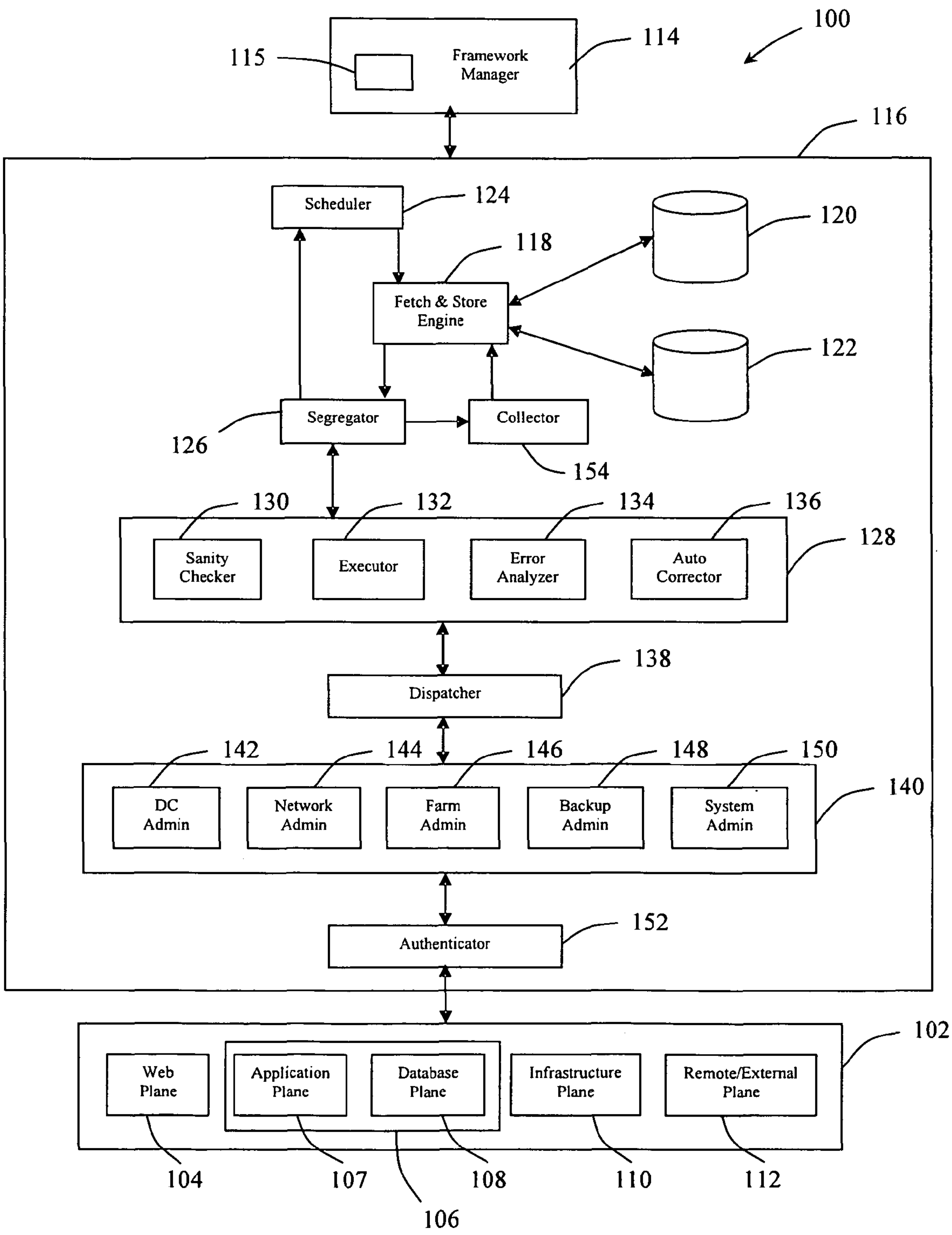
FIG. 1 is a schematic diagram of an apparatus for testing a utility computing system in accordance with an embodiment of the present invention, with the apparatus shown in communication with an enterprise data center.

There will be described apparatus for testing a utility computing system having a plurality of hardware and/or software planes, said apparatus comprising of a plurality of administration units, each administration unit being arranged to carry out test operations on a utility computing system during use, and each administration unit having associated access details usable to gain access to at least one plane of the utility computing system during use; an authenticator arranged to receive access details and to permit or restrict access by an administration unit to one or more planes of the utility computing system during use depending on whether the received access details correspond to the access details associated with the administration unit; and a dispatcher arranged, for each administration unit, to automatically forward the access details associated with the administration unit to the authenticator so as to thereby permit the administration unit to gain access to one or more planes of the utility computing system during use and carry out test operations on said accessed one or more planes.

In one arrangement, the apparatus further comprises a plurality of hardware and/or software components, and a framework manager arranged to facilitate configuration of at least one of the components by a user. The framework manager may be implemented using a workflow manager or a web based tool. In one embodiment, the framework manager is arranged to facilitate creation of test details by a user, the test details being indicative of at least one test operation to be carried out on a utility computing system during use by at least one administration unit. The framework manager may also be arranged to facilitate creation for each administration unit of test operations to be carried out on a utility computing system during use by the administration unit.

In one arrangement, the apparatus further comprises a test data storage device arranged to store test details indicative of at least one test operation to be carried out on a utility computing system during use by at least one administration unit. The apparatus may further comprise at least one execution application, each execution application being arranged to cause at least one administration unit to carry out at least one test operation on a utility computing system during use, and a segregator arranged to invoke at least one execution application based on the test details.

The at least one execution application may comprise at least one of a sanity checker, an executor and an error analyzer. The apparatus may further comprise an auto corrector arranged to cause at least one administration unit to carry out at least one correction operation on a utility computing system during use in response to results of at least one test operation. The apparatus may further comprise a test results storage device arranged to store results of at least one test operation carried out on a utility computing system during use by at least one administration unit.

In one embodiment, the apparatus further comprises a scheduler arranged to facilitate creation and execution of a schedule indicative of the dates and times at which tests are to be carried out on a utility computing system during use.

The administration units may comprise at least one of a data center administration unit, a network administration unit, a farm administration unit, a backup administration unit and a system administration unit.

The present technique broadly relates to a method and corresponding apparatus for testing a utility computing system, in this example in the form of an enterprise data center having a plurality of planes, which enables data center personnel to offload their tasks to the apparatus such that data center testing duties of all data center personnel can be carried out in an automated fashion.

This is achieved by facilitating storage of authentications associated with the data center personnel, and arranging the apparatus so as to mimic the roles of the data center personnel using the stored authentications to thereby gain access to desired planes of the data center. Following automatic authentication in this way, predefined tests may be carried out on one or more of the planes.

Referring to FIG. 1 of the drawings, there is shown an apparatus 100 for testing a utility computing system in accordance with an embodiment of the foregoing description, the apparatus 100 in this example being used to carry out tests on a utility computing system in the form of an enterprise data center 102. In this example, the data center 102 includes a web plane 104, a management plane 106, consisting of an application plane 107 and a database plane 108, an infrastructure plane 110 and a remote and/or external plane 112, although it will be understood that any suitable plane may be included.

In the present example, the web plane 104 includes infrastructure hosting a web interface such as a web server; the application plane 107 includes infrastructure hosting software which manages the data center 102; the database plane 108 includes infrastructure hosting one or more databases which help the application plane 107 to manage the automated data center 102; the infrastructure plane 110 includes all user accessible resources of the data center 102, for example storage resources such as XP, EVA and Brocade switches, network resources such as network switches and routers, and servers such as PA-RISC, Windows and Linux servers; and the external plane 112 includes all external aspects of the data center 102 which access the data center 102 from an external domain, such as backup software.

The apparatus 100 in this example includes a framework manager 114 arranged to facilitate individual configuration of components 116 of the apparatus 100. The framework manager 114 may be in the form of a workflow engine arranged so that a user is able to log in directly to the framework manager 114 and thereby set up or modify the configurations of the components 116 of the apparatus 100 or, as in the present example, the framework manager 114 may comprise a web based tool 115 hosted by the framework manager 114 itself. In particular, the framework manager 114 is usable to create test details which determine test operations and correction operations to be carried out in data center tests, to create test and correction operations to be carried out on a data center as part of a test, and to integrate the test operations into appropriate administrator units so that the test and correction operations are grouped according to administrator roles.

The framework manager 114 is also useable to create and store the authentications necessary for the administration units to gain access to the planes 104, 106, 108, 110, 112 of the data center 102. It will be understood that in this example the framework manager 114 and each of the components 116 is a software module or a physical processing system. The components 116 of the apparatus 100 include a fetch and store engine 118 arranged to carry out storage and retrieval operations on a test data storage device 120 and a test results storage device 122, each of which in this example is in the form of a database. The test data storage device 120 is arranged to store details of one or more tests to be carried out on the data center 102, with details of each test being created using the framework manager 114 and stored in the test data storage device 120 by the fetch and store engine 118. For each test, the test details contain a sequence of test steps to be performed. Each test step has information about the administration role, plane to be accessed and the action to be performed.

The test results storage device 122 is arranged to store details of results of a test after the test has been carried out on the data center 102. As with the test data storage device 120, the test results are stored in the test results storage device 122 by the fetch and store engine 118. The components 116 also include a scheduler 124 arranged in association with the framework manager 114 to facilitate creation of a schedule of dates and times at which tests stored in the test data storage device 120 are to be carried out. The scheduler 124 is also arranged such that when a test stored in the test data storage device 120 is due to be carried out, the scheduler 124 instructs the fetch and store engine 118 to retrieve details of the test from the test data storage device 120. On receipt of the test details, the fetch and store engine 118 forwards the test details to a segregator 126 arranged to communicate with an execution block 128 and to invoke one or more execution applications in the execution block 128 so as to carry out a desired test or correction operation on the data center 102.

In this example, the execution applications include a sanity checker 130, an executor 132, an error analyzer 134 and an autocorrector 136. The execution block 128 communicates with a dispatcher 138 arranged to receive instructions from the execution block 128 and to assume responsibility for control of a test from the execution block 128. The primary purpose of the dispatcher 138 is to mimic the roles of administrators of the data center 102 by automatically providing authentication details to an authenticator 152 for each of the administrators associated with the test as and when necessary, to break down the test into individual steps, then carry out the test action to be performed. In this way, the dispatcher 138 facilitates communications between the execution applications 130, 132, 134, 136 and the planes of the data center 102.

In communication with the dispatcher 138 is a role block 140, the role block 140 including a plurality of administration units, each of which is arranged to perform operations corresponding to an administrator role, such as performing one or more test operations and/or correction operations on the data center 102.

In this example, the role block 140 includes a data center administration unit 142, a network administration unit 144, a farm administration unit 146, a backup administration unit 148 and a system administration unit 150. However, it will be understood that other suitable administration units may be provided.

It will also be understood that operations performed by a data center administrator, a network administrator, a farm administrator, a backup administrator and a system administrator correspond with operations performed by the data center administration unit 142, the network administration unit 144, the farm administration unit 146, the backup administration unit 148 and the system administration unit 150 respectively. The role block 140 communicates with the authenticator 152 which is arranged to communicate with the data center 102 so as to verify authentications and thereby permit or restrict access to one or more planes 104, 106, 108, 100, 112 of the data center 102 depending on the level of access associated with a particular administration unit seeking access to the data center 102. The results of a test carried out on the data center 102 are passed back to the segregator 126, and the segregator 126 passes the test results to a collector 154 arranged to instruct the fetch and store engine 118 to store the test results in the test results storage device 122.

Figure 2:
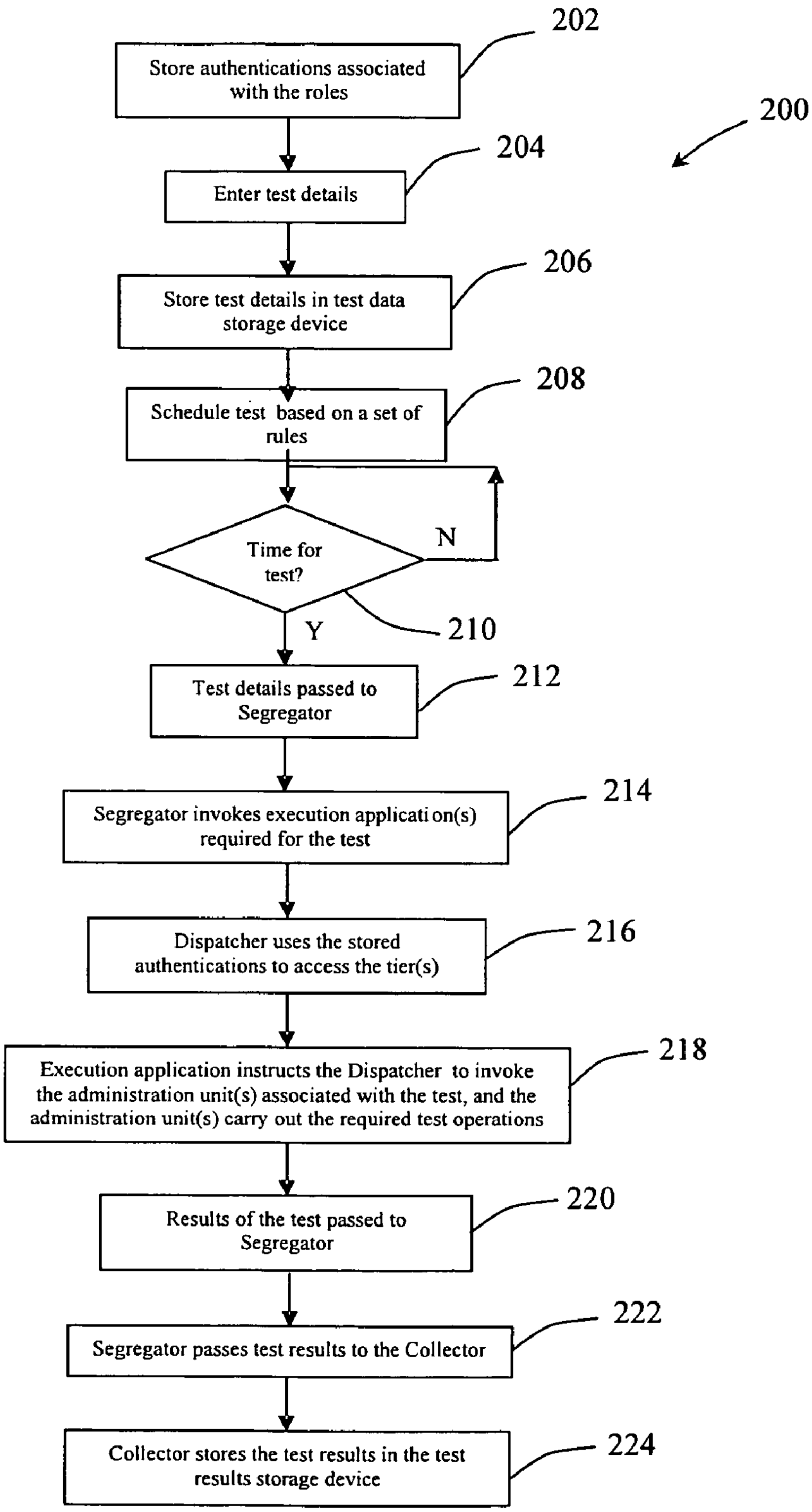
FIG. 2 is a flow diagram illustrating steps of a method of testing a utility computing system in accordance with an embodiment of the present invention.

An example illustrating operation of the apparatus 100 will now be described in relation to FIG. 2 which is a flow diagram 200 showing steps 202 to 224 of a method of testing a utility computing system in accordance with the forgoing description. The flow diagram 200 illustrates operation of the apparatus 100 when a test is able to be completed without errors. As indicated at step 202 of the flow diagram 200, as a preliminary step authentications associated with the roles defined in the role block 140 are stored in the dispatcher 138 using the framework manager 114. The stored authentications are used subsequently to carry out authentications and thereby gain access to one or more planes 104, 106, 108, 110, 112 of the data center 102 by one or more of the administration units 142, 144, 146, 148, 150.

As indicated at steps 204 and 206, a user defines details of one or more tests desired to be carried out on at least one plane 104, 106, 108, 110, 112 of the data center 102 using the framework manager 114 and the created tests are stored in the test data storage device 120 by the fetch and store engine 118 under control of the framework manager 114. While in this example a user creates test details and stores the test details in the test storage device 120 for execution shortly thereafter, it will be understood that the test details would ordinarily be predefined and stored in the test data storage device 120 so that it is not necessary for a user to always define test details prior to test execution. As indicated at steps 208 to 212 of the flow diagram 200, the scheduler determines the date and time of execution of a test based on a set of rules which are definable by a user through the framework manager 114. The arrangement is such that when the schedule indicates that a particular test is due for execution, the scheduler 124 instructs the fetch and store engine 118 to retrieve the test details associated with the test from the test data storage device 120 and to pass the test details to the segregator 126.

As indicated at steps 214 and 216, based on the test details, the segregator 126 invokes the relevant execution application(s) 130, 132, 134, 136 required to carry out the test, and the dispatcher 138 communicates with the authenticator 152 so as to carry out the authentications necessary to gain access to the plane(s) which are to form part of the test. As indicated at step 218, following valid authentication, the invoked execution application 130, 132, 134, or 136 in turn instructs the dispatcher 138 to invoke the administration units(s) 142, 144, 146, 148, 150 associated with the test, and the administration unit(s) carry out the required test operations and/or correction operations on the relevant planes of the data center 102 determined in accordance with the test details.

After completion of the test, as indicated at steps 220 to 224 the results of the test are passed to the segregator 126, and the collector 154 instructs the fetch and store engine 118 to store the test results in the test results storage device 122. In a particular example, test details stored in the test data storage device 120 correspond to a sanity and status check of the data center 102. When the test is due, the scheduler 124 instructs the fetch and store engine 118 to retrieve test details corresponding to a sanity and status check from the test data storage device 120, and the fetch and store engine 118 passes the test details to the segregator 126. The segregator 126 then invokes the sanity checker execution application 130 in the execution block.

Since sanity checking function is part of the role of a system administrator, the dispatcher 138 communicates with the authenticator 152 so as to carry out the necessary authentications for a system administrator. Following successful authentication the sanity checker 130 through the dispatcher 138 invokes the system administration unit 150 which carries out the required sanity and status checking test operations on all planes of the data center 102. Results of the test operations are passed to the segregator 126 and the collector 154 instructs the fetch and store engine 118 to store the test results in the test results storage device 122. In a further example, stored test details correspond to a test usable to carry out validation of a farm creation customer use case; in other words, a test useable to determine whether any errors occur when a farm is created.

In a real situation, creation of a farm may involve a farm administrator logging into a web plane 104 of the data center 102, designing the farm and submitting the farm for activation. This causes a work ticket to be sent to the data center administrator informing the data center administrator that the farm administrator has designed a new farm and submitted the farm for activation. The data center administrator is then required to validate the farm request against a Service Level Agreement and if valid, the data center administrator issues a command to the farm management server to activate the farm. As the farm is activated, a utility controller server virtually "wires" assigned components in the service core via virtual Local Area Networks (LANs) to implement the farm design. Once these service core devices are wired, software images are installed on the assigned computer data service, and the farm is ready for customer use. The data center administrator then sends a request to a backup administrator to set up the farm service for backup purposes and the backup administrator notifies the data center administrator when this has been done. After completion of these actions, the data center administrator notifies the farm administrator that the farm is ready for use.

Using the present apparatus 100, a test may be defined so that operations corresponding to the actions required to set up the farm are automatically carried out, with the dispatcher 138 in turn mimicking the actions of the farm administrator, the data center administrator and the backup administrator by authenticating the farm administrator, the data center administrator and the backup administrator using the stored authentications, and the dispatcher 138 invoking the farm administration unit 146, the data center administration unit 142 and the backup administration unit 148 as and when necessary to carry out the required test operations on the data center 102 corresponding to actions which would be carried out by a farm administrator, a data center administrator and a backup administrator. Using the framework manager 114, a user is able to define test details, that is, the test steps to be included in a test case. The Framework Manager 114 internally converts the test case description into XML format and stores it in the test data storage device 120. A typical test case description in XML format is shown below.

```
<test>
<step>
<id>1</id>
<role>FarmAdmin
<action>DesignFarm</action>
<plane>WebPortal</plane>
</role>
</step>
<step>
<id>2</id>
<role>DataCenterAdmin
<action>FarmActivate</action>
<plane>Management</plane>
</role>
</step>
<step>
<id>3</id>
<role>FarmAdmin
<action>UpdateFarm</faction>
<plane>WebPortal</plane>
</role>
</step>
<step>
<id>4</id>
<role>DataCenterAdmin
<action>FarmActivate</action>
<plane>Management</plane>
</role>
</step>
<step>
<id>5</id>
<role>DataCenterAdmin
<action>FarmDeActivate</action>
<plane>Management</plane>
</role>
</step>
<step>
<id>6</id>
<role>FarmAdmin
<action>FarmDelete</action>
<plane>WebPortal</plane>
</role>
</step>
</test>
```

Figure 3:
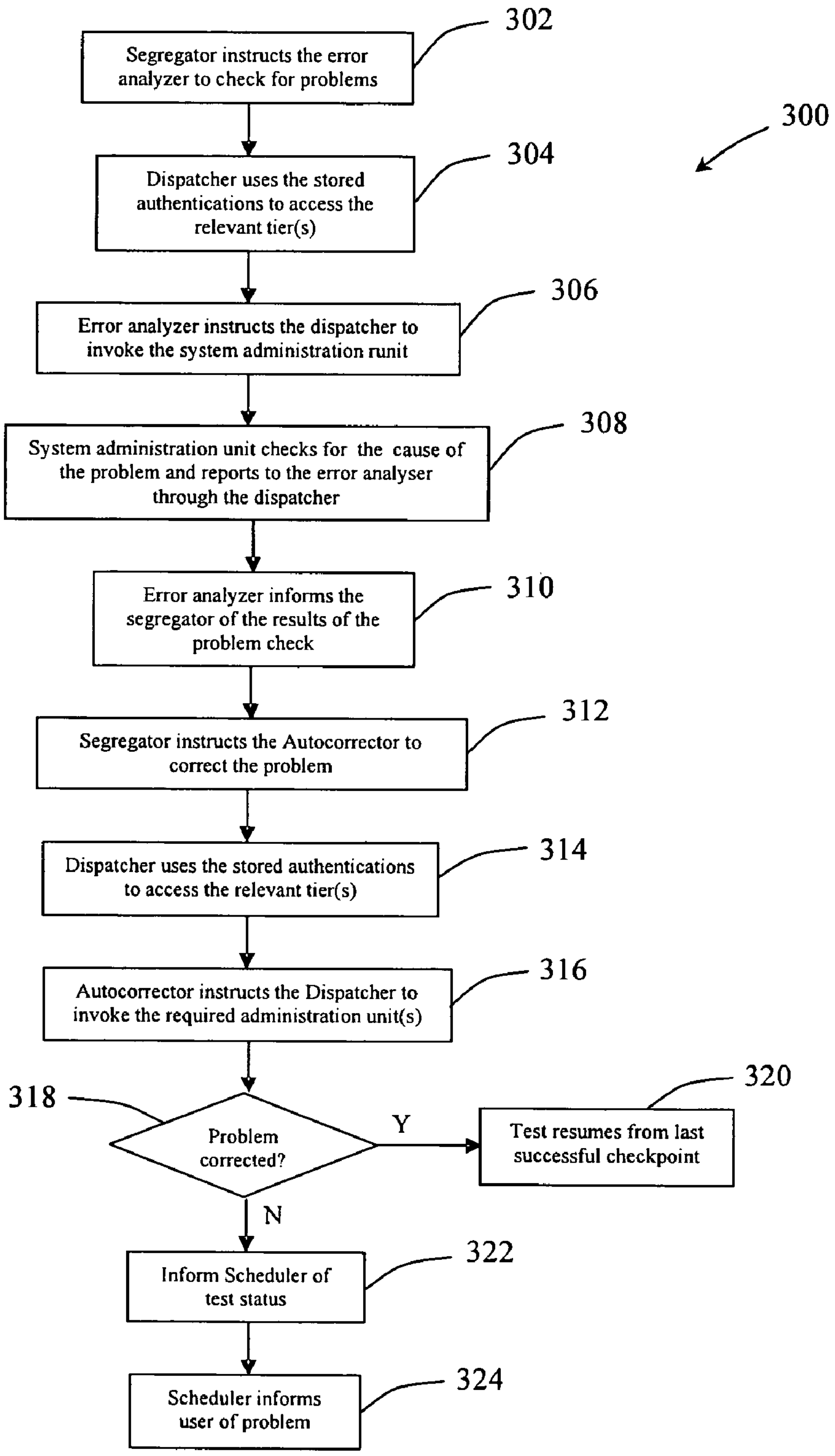
FIG. 3 is a flow diagram illustrating steps of the method of FIG. 2 when an error occurs during testing.

If a test cannot be executed due to an error, the steps of the flow diagram 300 shown in FIG. 3 are followed with a view to identifying and correcting the error. Referring to the flow diagram 300, if an error occurs during a test, the collector 154 instructs the fetch and store engine 118 to store the test result with the status as 'fail'. The segregator 126 then invokes the error analyzer application 134 in the execution block to attempt to identify the problem. The error analyzer 134 through the dispatcher 138 invokes the system administration unit 150. This causes the system administration unit 150 to carry out test operations relevant to determining the cause of the problem. In order for the system administration unit 150 to gain access to the data center 102, the dispatcher 138 communicates with the authenticator 152 so as to carry out the necessary authentications required for the system administration unit 150 to access the data center 102. Results of the test operations carried out by the system administration unit 150 are forwarded to the segregator 126, and the segregator 126 passes the test results to a collector 154 arranged to instruct the fetch and store engine 118 to store the test results in the test results storage device 122. This part of the error detecting process is indicated at steps 302 to 310 of the flow diagram 300.

If the problem has been identified by the system administration unit 150, the segregator 126 then invokes the auto corrector 136 in the execution block to correct the problem and to this end the auto corrector 136 instructs the dispatcher 138 to invoke the required administration unit(s) 142, 144, 146, 148, 150 necessary to correct the problem. The result, either PASS or FAIL, are passed on to the collector 154 which further updates the fetch and store engine 118. If the result is a FAIL, then the scheduler 124 indicates to the user that a severe problem exists in the data center 102 which can not be corrected. This part of the error checking process is indicated at steps 312 to 324 of the flow diagram 300. If the test result is a PASS, the scheduler 124 instructs the fetch and store engine 118 to retrieve the test details such that the test resumes from the last successful checkpoint. It will be appreciated that the apparatus 100 may be implemented at one location or the apparatus 100 may be implemented by locating different parts of the apparatus at different locations, with the different parts communicating with each other by any suitable communications network, such as the Internet.

There has been described a method of testing a utility computing system having a plurality of hardware and/or software planes, providing a plurality of administration units, each administration unit being arranged to carry out associated test operations on a utility computing system during use; storing for each administration unit associated access details usable to gain access to at least one plane of the utility computing system during use; providing an authenticator arranged to receive access details and to permit or restrict access by an administration unit to one or more planes of the utility computing system during use depending on whether the received access details correspond to the access details associated with the administration unit; invoking an administration unit so as to carry out at least one test operation associated with the administration unit; automatically forwarding the access details associated with the invoked administration unit to the authenticator so as to thereby permit the administration unit to gain access to one or more planes of the utility computing system during use; and carrying out at least one test operation associated with the invoked administration unit on said accessed one or more planes.

The foregoing description of the exemplary embodiments is provided to enable any person skilled in the art to make or use the present technique. While the present technique has been described with respect to particular illustrated embodiments, various modifications to these embodiments will readily be apparent to those skilled in the art, and the generic principles defined herein may be applied to other embodiments without departing from the spirit or scope of the present disclosure. It is therefore desired that the present embodiments be considered in all respects as illustrative and not restrictive. Accordingly, the present technique is not intended to be limited to the embodiments described above but it is to be accorded the widest scope consistent with the principles and novel features disclosed herein.

We claim:

1. An apparatus for testing a utility computing system having a plurality of hardware and/or software planes, said apparatus comprising:

a processor;

a plurality of hardware and/or software components, the software executed by the processor, the components including:

a plurality of administration units, each administration unit being arranged to carry out test operations on a utility computing system during use, and each administration unit having associated access details usable to gain access to at least one plane of the utility computing system during use;

an authenticator arranged to receive access details and to permit or restrict access by an administration unit to one or more planes of the utility computing system during use depending on whether the received access details correspond to the access details associated with the administration unit; and a dispatcher arranged, for each administration unit, to automatically forward the access details associated with the administration unit to the authenticator so as to thereby permit the administration unit to gain access to one or more planes of the utility computing system during use and carry out test operations on said accessed one or more planes;

wherein the dispatcher is arranged, after the administration unit is permitted to gain access to one or more planes of the utility computing system, to invoke the administration unit associated with the test operations; and wherein the utility computing system is an enterprise data center.

2. An apparatus as claimed in claim 1, further comprising a framework manager arranged to facilitate configuration of at least one of the components by a user.

3. An apparatus as claimed in claim 2, wherein the framework manager is implemented using a workflow manager or a web based tool.

4. An apparatus as claimed in claim 2, wherein the framework manager is arranged to facilitate creation of test details by a user, the test details being indicative of at least one test operation to be carried out on a utility computing system during use by at least one administration unit.

5. An apparatus as claimed in claim 2, wherein the framework manager is arranged to facilitate creation for each administration unit of test operations to be carried out on a utility computing system during use by the administration unit.

6. An apparatus as claimed in claim 2, wherein the framework manager is arranged to facilitate creation for each administration unit of access details usable to gain access to at least one plane of the utility computing system during use.

7. An apparatus as claimed in claim 1, further comprising a test data storage device arranged to store test details indicative of at least one test operation to be carried out on a utility computing system during use by at least one administration unit.

8. An apparatus as claimed in claim 7, further comprising at least one execution application, each execution application being arranged to cause at least one administration unit to carry out at least one test operation on a utility computing system during use, and a segregator arranged to invoke at least one execution application based on the test details.

9. Apparatus as claimed in claim 8, wherein the at least one execution application comprises at least one of a sanity checker, an executor and an error analyzer.

10. An apparatus as claimed in claim 1, further comprising an autocorrector arranged to cause at least one administration unit to carry out at least one correction operation on a utility computing system during use in response to results of at least one test operation.

11. An apparatus as claimed in claim 1, further comprising a test results storage device service arranged to store results of at least one test operation carried out on a utility computing system during use by at least one administration unit.

12. An apparatus as claimed in claim 1, further comprising a scheduler arranged to facilitate creation and execution of a schedule indicative of the dates and times at which tests are to be carried out on a utility computing system during use.

13. An apparatus as claimed in claim 1, wherein the administration units comprise at least one of a data center administration unit, a network administration unit, a farm administration unit, a backup administration unit and a system administration unit.

14. A method of testing a utility computing system having a plurality of hardware and/or software planes, said method comprising:

providing a plurality of administration units, each administration unit being arranged to carry out associated test operations on a utility computing system during use;

storing for each administration unit associated access details usable to gain access to at least one plane of the utility computing system during use;

providing an authenticator arranged to receive access details and to permit or restrict access by an administration unit to one or more planes of the utility computing system during use depending on whether the received access details correspond to the access details associated with the administration unit;

automatically forwarding, by a dispatcher, the access details associated with an administration unit to the authenticator so as to thereby permit the administration unit to gain access to one or more planes of the utility computing system during use;

invoking, by the dispatcher and as a result of the administration unit being permitted to gain access to one or more planes of the utility computing system, the administration unit so as to carry out at least one test operation associated with the administration unit;

carrying out at least one test operation associated with the invoked administration unit on said accessed one or more planes, wherein the utility computing system is an enterprise data center.

15. A method as claimed in claim 14, further comprising facilitating creation of test details by a user, the test details being indicative of at least one test operation to be carried out on a utility computing system during use by at least one administration unit.

16. A method as claimed in claim 14, further comprising facilitating creation for each administration unit of test operations to be carried out on a utility computing system during use by the administration unit.

17. A method as claimed in claim 14, further comprising facilitating creation for each administration unit of access details usable to gain access to at least one plane of the utility computing system during use.

18. A method as claimed in claim 14, further comprising storing test details indicative of at least one test operation to be carried out on a utility computing system during use by at least one administration unit.

19. A method as claimed in claim 14, further comprising:

providing at least one execution application arranged to cause at least one administration unit to carry out at least one test operation on a utility computing system during use; and providing a segregator arranged to invoke at least one execution application based on the test details.

20. A method as claimed in claim 19, wherein the at least one execution application comprises at least one of a sanity checker, an executor and an error analyzer.

21. A method as claimed in claim 14, further comprising carrying out at least one correction operation on a utility computing system during use in response to results of at least one test operation.

22. A method as claimed in claim 14, further comprising storing results of at least one test operation carried out on a utility computing system during use by at least one administration unit in the test results storage device.

23. A method as claimed in claim 14, further comprising providing a scheduler arranged to facilitate creation of a schedule indicative of the dates and times at which tests are to be carried out on a utility computing system during use.

24. A method as claimed in claim 14, wherein the administration units comprise at least one of the data center administration unit, the network administration unit, a farm administration unit, a backup administration unit and a system administration unit.

* * * * *

UNITED STATES PATENT AND TRADEMARK OFFICE

CERTIFICATE OF CORRECTION

PATENT NO. : 7,962,789 B2
APPLICATION NO. : 11/476259
DATED : June 14, 2011
INVENTOR(S) : Sahana Prabhakar Sampigeet et al.

It is certified that error appears in the above-identified patent and that said Letters Patent is hereby corrected as shown below:

In column 9, line 10, in Claim 9, delete "Apparatus" and insert -- An apparatus --, therefor.

Signed and Sealed this
Sixth Day of December, 2011

David J. Kappos
*Director of the United States Patent and Trademark Office*